July 14, 1953 G. E. ROWE 2,645,059
APPARATUS FOR AND METHOD OF FORMING PASTE MOLD GLASSWARE
Filed March 5, 1951 2 Sheets-Sheet 1
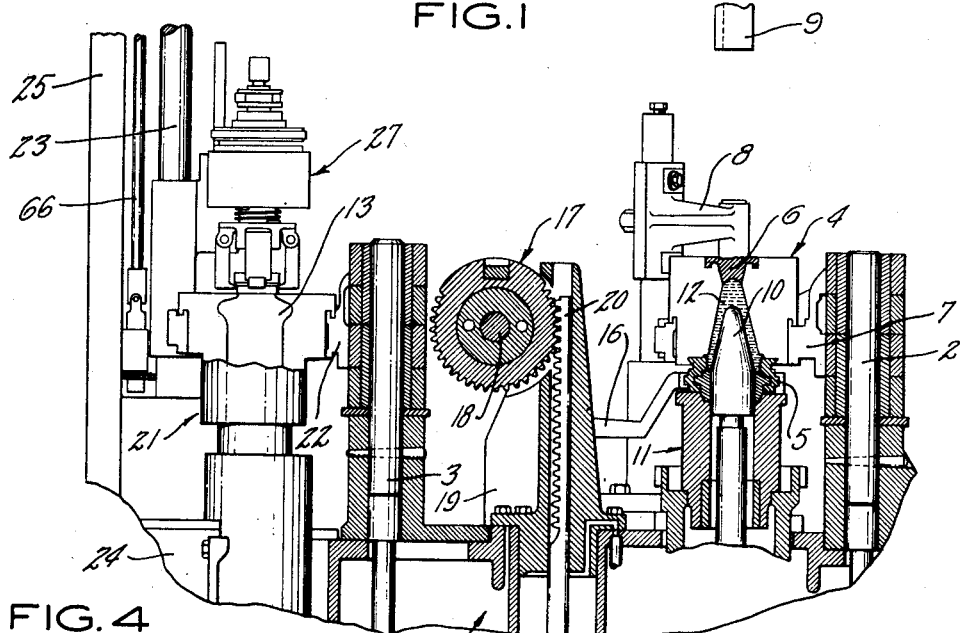
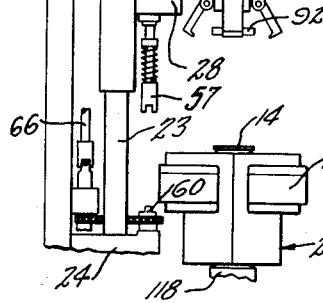
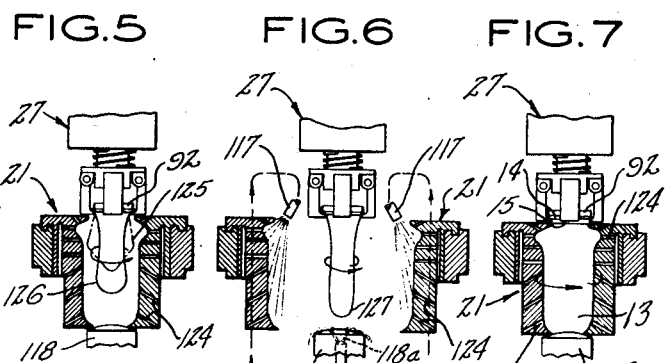
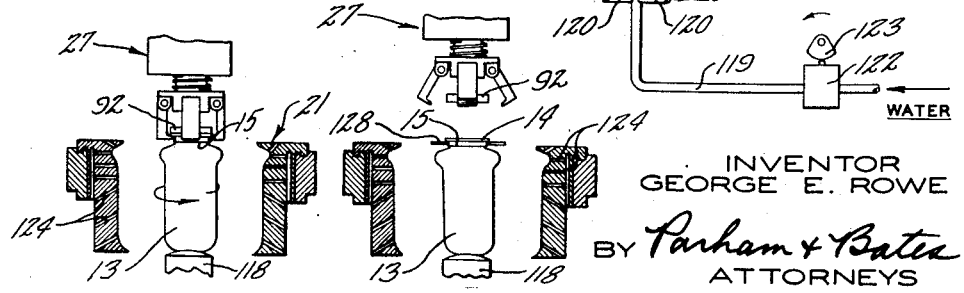
INVENTOR
GEORGE E. ROWE
BY Parham & Bates
ATTORNEYS July 14, 1953  G. E. ROWE  2,645,059
APPARATUS FOR AND METHOD OF FORMING PASTE MOLD GLASSWARE
Filed March 5, 1951  2 Sheets-Sheet 2
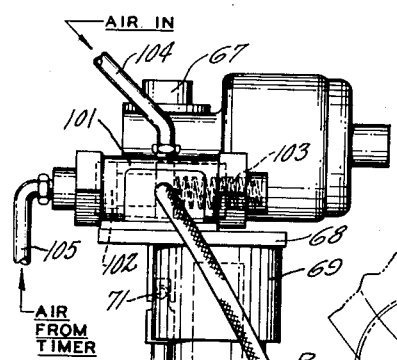
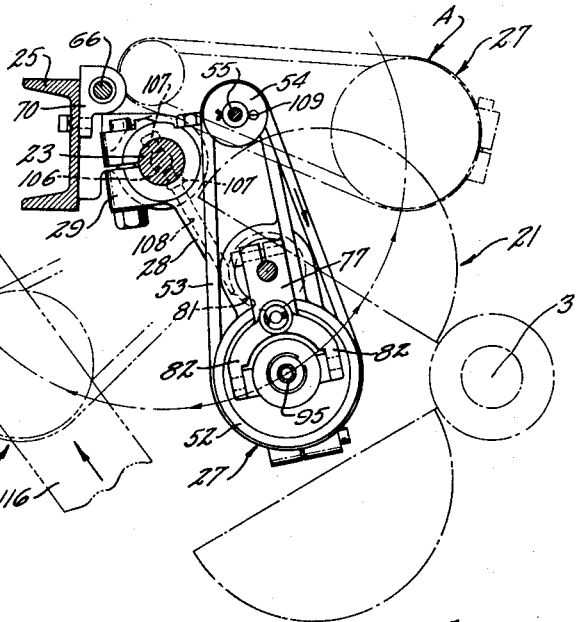
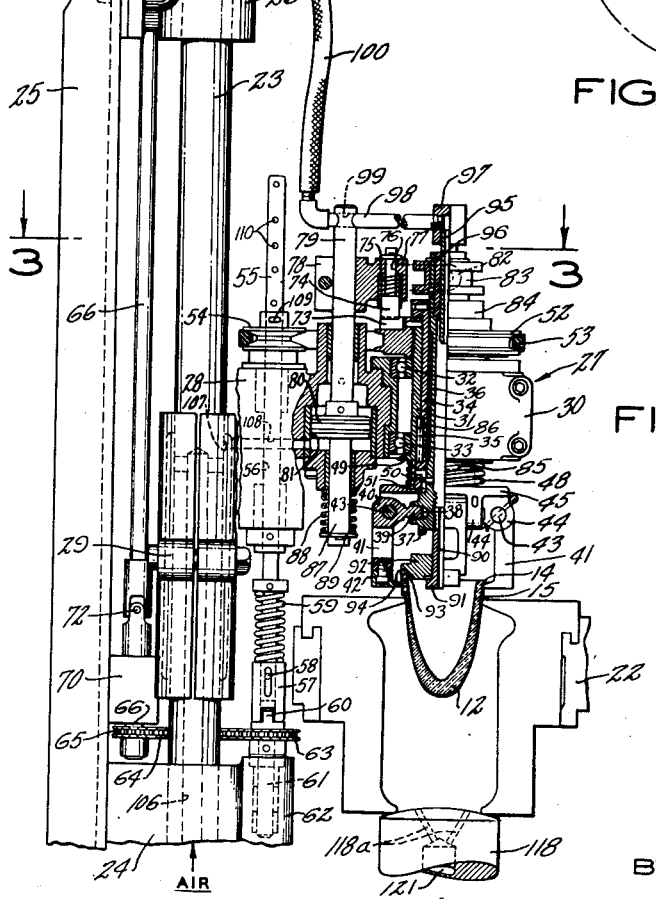
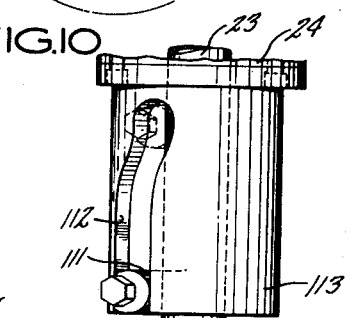
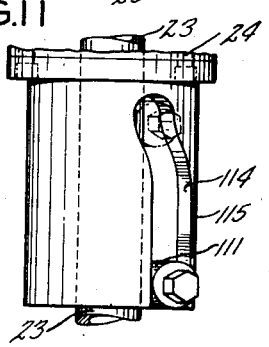
INVENTOR
GEORGE E. ROWE
BY Parham & Bates
ATTORNEYS Patented July 14, 1953

2,645,059

UNITED STATES PATENT OFFICE 2,645,059

APPARATUS FOR AND METHOD OF FORMING PASTE MOLD GLASSWARE

George E. Rowe, Wethersfield, Conn., assignor to Emhart Manufacturing Company, Hartford, Conn., a corporation of Delaware Application March 5, 1951, Serial No. 213,956

14 Claims. (Cl. 49—18)

This invention relates to improvements in apparatus for and methods of making paste mold glassware.

An object of the invention is to provide practical and efficient paste mold equipment which can be readily applied to a known type of hot mold glassware forming machine in lieu of the usual hot final blow mold and a few removable standard parts of that machine so as to convert such machine to paste mold operation.

A further object of the invention is to provide paste mold equipment of the character described which, when applied as aforesaid and in use, will cooperate with retained parts of the basic hot mold machine to produce paste mold ware of high quality and in an improved manner.

Other objects and advantages of the invention will be pointed out in or appear from the description hereinafter given of paste mold equipment as applied in accordance with the invention and as used to produce ware.

1. The assembly permits upward pressing of a mold charge to the desired preliminary form in an inverted neck ring and parison press mold at a relatively fixed station, transfer of the pressed parison, with its neck portion still in the neck ring, by an inverting, swinging movement of the neck ring to a horizontally spaced, also fixed, blowing station, release of the parison from the neck ring to the upright paste mold at the blowing station, and rotation and suspension of the parison in the paste mold by rotating grippers during development and blowing of the parison to final form in the paste mold. This sequence of operations and the instrumentalities employed give improved results in the production of paste mold ware.

2. The parison is lifted slightly by grippers immediately after transfer to the paste mold so as to be rotatable about its vertical axis by the grippers without contact with the top of the paste mold.

3. The paste mold is opened when the grippers have seized the upper end of the parison hanging in the mold and have taken over support of the parison, thus providing time and opportunity for wetting of the internal surfaces of the mold sections and observation of the parison at its then stage of development, the paste mold later being closed for completion of the blowing of the parison to final form.

4. The pressure of the blowing air introduced into the parison in the paste mold is maintained substantially constant and moderate by a novel, self-adjusting, pressure relief arrangement at the top of the suspended, rotating parison.

5. A novel combination parison gripping, rotating and blowing mechanism is operatively positioned at the top of the paste mold during blowing of the parison to final form and until the paste mold opens to clear the finally blown article, whereupon such mechanism may be appropriately operated and moved to serve as a take-out for the article.

For details of illustrative structure embodying or providing these and other features of the invention, reference is made to the accompanying drawings, in which:

Fig. 1 is a fragmentary view, mainly in longitudinal vertical section and partly in elevation, of a glassware forming machine including paste mold equipment in accordance with the invention;

Fig. 2 is a relatively enlarged, fragmentary view, mainly in elevation of the paste mold equipment alone, the combination blow head and gripper mechanism being partially broken away and in section and only a half section of the paste mold being shown;

Fig. 3 is a section along the line 3—3 of Fig. 2, the paste mold being shown diagrammatically with the halves thereof open and the view also showing in dot-and-dash lines two alternative relatively right and left hand positions to which the combination blow head and gripper mechanism may be swung from its position at the paste mold station indicated by the full lines;

Fig. 4 is a relatively reduced fragmentary elevation of the paste mold equipment with the elements thereof relatively positioned as at a time in a cycle of operations when a parison has just been transferred to the paste mold and is supported thereby, the combination blow head and gripper mechanism still being in its raised, inactive position, the grippers being open;

Figs. 5 to 9, inclusive, respectively are fragmentary sectional and somewhat schematic views showing relative positions of the combination blow head and grippers and paste mold and of the relatively movable parts of each at different stages in a cycle of operations for forming a parison into a hollow glass paste mold article;

Fig. 10 is a fragmentary elevation of a removable and replaceable spirally slotted cam sleeve and associate parts of a mechanism for swinging the combination blow head and grippers to the right from the full line position of Fig. 3 as such combination head and grippers is raised; and Fig. 11 is a view like 10 but showing an alternative arrangement to effect lateral swinging of the combination head and grippers to the left as raised from the full line position of Fig. 3.

The type of glassware forming machine to be converted to paste mold operation according to the invention has an inverted blank or parison mold at a fixed station together with accessory blank or parison forming equipment, an upright final blow mold at a second fixed station horizontally spaced from the parison or blank mold station, a neck ring transfer means operable to transfer each preliminarily formed blank or parison from the first station to the blow mold station and to deliver it to the closing blow mold, and a final blow head equipped with blowing means and operable to blow the blank or parison in the blow mold to the shape of the final article desired.

The Ingle Patent 1,911,119, of May 23, 1933, discloses a blow-and-blow or "narrow neck" variety of this type of glassware forming machine, such variety being characterized by use of a neck pin in the neck ring and conventional settle blowing and counter-blowing operations to form each charge delivered to the parison mold into a parison suitable to be blown into a bottle or other narrow neck article in the final blow mold.

Applicant's Patent 2,508,890, of May 23, 1950, discloses a "press-and-blow" variety of this machine, in which each mold charge delivered to the inverted blank or parison mold is pressed by an upwardly moving pressing plunger therein into the hollow blank or parison desired. Both varieties, commonly known as "Hartford-Empire I. S. Machines" are in use in the practical art. The paste mold equipment of the present invention may be substituted for certain standard parts and used in conjunction with the remaining parts of either of these two varieties of the glassware forming machine described. I prefer, however, to apply the invention to the "press-and-blow" variety as it has been determined by actual trial that the parison pressing and transfer provisions of that variety of machine cooperate with the provisions of the substitute paste mold equipment to produce paste mold ware of good quality in an improved manner. The manner of converting such a machine to paste mold operation will now be described with particular reference to the example shown by the accompanying drawings.

Referring to Fig. 1, the frame work of a machine of the character described is shown in part and is indicated generally at 1. Uprising from horizontally spaced portions of this frame work are a parison mold column or post 2 and a blow mold column or post 3. Hinged to the parison mold post 2 is an inverted parison mold comprising a conventional two-part press mold 4, only one part of which is shown, a similarly conventional two-part neck ring 5 and a parison mold baffle or bottom plate 6. The parts of the press mold 4 are hinged to the post 2 as at 7 in a conventional manner so that these mold parts can be swung by the usual means (not shown) to open and closed positions. The bottom plate or baffle 6 is carried by a movable arm 8 operable by conventional means (not shown) so as to be disposed out of the way when a charge delivered to the closed parison mold, as from a suitably located charged delivery chute or trough 9 and thereafter to be moved to its active position at the top of the inverted parison mold 4 as shown in Fig. 1.

The parison forming provisions includes a vertically movable inverted pressing plunger 10 which is supported and guided by suitable known structure, including the parts generally indicated at 11 in Fig. 1, so as to be raisable from a lower position in the inverted parison mold to the pressing position shown in Fig. 1. This operation distributes the glass of the charge throughout the wall of the inverted parison designated 12, to an extent and in a manner which have been found advantageous to pre-condition the parison for subsequent development and blowing in a paste mold to form the paste mold article of glassware desired. The glass of the wall of the parison, particularly in the neck and adjacent part of its body, has been stiffened by extraction of heat therefrom both internally and externally so as to be in suitable condition to be swung and inverted by the neck ring, as hereinafter will be explained, during transfer to the blow mold station and thereafter to be gripped by rotary grippers and rotated in and relative to a paste mold at that station after transfer from the neck ring to the paste mold has been effected. The parison indicated at 12 in Fig. 1 is suitable to be formed into a hollow paste mold article as indicated at 13 in Figs. 7, 8 and 9. This parison is formed with a bead 14, Figs. 2 and 4, at its rim or open end and with a ledge or shoulder as indicated at 15, Fig. 2, facing away from the bead and spaced therefrom, these for purposes presently to be pointed out. Also, in order to assure desirably firm gripping and rotation of the parison in the paste mold by overhead grippers as hereinafter described, the parison may be formed with external lugs or projections (not shown) thereon directly beneath the bead.

The neck ring 5 comprises cooperative halves carried by arms such as that indicated at 16 in Fig. 1, there being an arm for each half. Such arms are mounted by means generally indicated at 17 to oscillate about the axis of a horizontal rock shaft 18 and also for relative lateral movements axially of the shaft 18 to open and close the neck ring halves, substantially as disclosed in the aforesaid Ingle Patent 1,911,119. An upright bracket 19 on the machine frame work supports rock shaft 18 at an intermediate location between the parison mold and blow mold stations. The neck ring arms are oscillated about the axis of rock shaft 18 by conventional enmeshed pinion and vertical rack means indicated at 20 so as periodically to swing the closed neck ring and the parison carried thereby from the parison mold station along an arc of approximately 180° to the blow mold station, the parison being swung and reverted by the neck ring during this movement. This swing and reverting movement of the parison aids its pre-conditioning for subsequent spinning, development and blowing at the blow mold station for formation of an article of paste mold glassware.

The blow mold post 3 is utilized in the basic glassware forming machine for supporting the halves of a conventional hot blow mold. In converting the machine to paste mold operation, the hot blow is removed and a paste mold, indicated at 21, is substituted therefor. This paste mold comprises halves carried by the usual blow mold arms 22, Figs. 2 and 4, which are hinged to the post 3 as indicated for one of the arms in Fig. 1.

Adjacent to the blow mold station is a vertical rod 23 uprising from a vertical cylinder 24, Figs. 1, 2 and 4. The cylinder is attached to a stationary upright support 25. The rod 23, which is movable vertically by a piston (not shown) in the cylinder 24 may be guided by a vertical bearing or bearings carried by the upright 25, one such bearing being indicated at 26 in Figs. 2 and 4. The rod 23 in the basic machine supports and operates a conventional blow head which is operatively associated with the hot blow mold. In converting the machine to paste mold operation according to the instant invention, the conventional blow head is removed and a special combination blow head and rotary gripper mechanism, generally indicated at 27, is substituted therefor. This mechanism is carried by a special arm 28 attached, as by a split-sleeve form of clamp 29 (Fig. 2) to the rod 23.

The combination blow head and gripper mechanism 27 is shown in detail in Fig. 2 and comprises a vertically disposed annular bearing housing 30 on the outer end of the arm 28. A rotary vertically disposed short tubular shaft 31 is journalled anti-frictionally in housing 30 by upper and lower ball bearing units 32 and 33.

An intermediate tubular member 34 fits slidably in the shaft 31 to which it is feathered at 35. An inner tubular member 36 is slidably disposed in the member 34. Member 36 projects both above and below the ends of member 34 and the latter projects both above and below the ends of the tubular shaft 31. The lower end portion 37 of the inner tubular member 36 is enlarged and peripherally grooved at 38 to engage with inturned relatively short and rounded actuating arms 39 of right angular levers 40 having depending longer arms 41 carrying inturned gripper jaw members or blades 42. The gripper levers 40, of which four are provided in the example shown, are mounted on short horizontal pivot pins 43, each of which extends between a pair of spaced depending lugs 44 on a supporting flange 45 which is provided on the lower extremity of intermediate tubular member 34. The tubular member 34 is urged constantly to the limit of its possible downward movement in tubular shaft 31 by a coil spring 48 which is compressed between the flange 45 and the lower end of the tubular shaft 31 which may be appropriately flanged at 49 for that purpose. A pin 50 projects from the inner tube 36 so as to prevent turning of the inner tube about its vertical axis independently of tube 34 and hence of the rotary shaft 31 while permitting limited independent vertical or axial movements of the inner tube.

The projecting upper end of the tubular shaft 31 carries a pulley 52, which may serve to retain such shaft against downward displacement in the bearings 32 and 33. A belt 53 is trained about pulley 52 and about a pulley 54 on a vertically disposed clutch shaft 55. The clutch shaft 55 is journalled in a vertical bore 56 in a portion of the arm 28 so as to be movable with that arm about the axis of the main supporting rod 23. The shaft 55 depends below the arm 28 and at its lower extremity carries a spring loaded clutch member 57 which may be of the jaw clutch type. The clutch member 57 is connected to the rod 55 by pin and slot arrangement indicated at 58 so as to have limited vertical movements relative to the rod and to be maintained normally at the lower limit of its stroke by a coil spring 59. The clutch member 57 is adapted to engage a clutch member 60 on the upper end of a short vertical shaft 61 uprising from a bearing 62 on a side of the cylinder 24. A sprocket 63 on the shaft 61 is driven by a chain 64 which is trained about that sprocket and also about a sprocket 65 on the lower end of a driven shaft 66. The shaft 66 depends from and is driven by a motorized reduction unit 67 mounted on a bracket 68 which is secured in place on the upper end of the bearing 26, as by a cap 69. The lower end portion of the shaft 66 may be journalled in a bearing 70 on a side of the supporting upright 25. The shaft 66 may include spaced universal joints as indicated at 71 and 72, respectively, as as to have desirable flexibility. By the arrangement just described rotation of the shaft 66 when the motorized unit 67 is energized will drive the clutch member 60.

When the arm 28 is in its lowered position, as shown in Fig. 2, the clutch member 57 will be engaged with the clutch member 60 and rotation will be imparted to the shaft 55. The shaft 55 rotates the pulley 54 and the latter tends to drive the pulley 52 through the belt connection 53. However, it is to be noted that the pulley 52 is provided with a notch 73 which, when the parts are in the position shown in Fig. 2, is still engaged by a downwardly projected latch pin 74 protruding from a socket 75 at the bottom of a vertical bore 76 in a supported arm 77. When the latch pin is thus engaged with the notch of the pulley 52, the belt will slip until a slight further upward movement of the latch pin 74 allows the pulley 52 to rotate, thereby rotating the gripper assembly.

The arm 77 has a clamping end portion 78 of the split collar type which embraces and is secured in an adjusted position on a vertical rod 79 projecting upwardly from a piston 80 in a vertical cylinder 81 formed in the arm 28. The outer end of the arm 77 is forked at 82 and engaged with a spool sleeve 83 which is fast on the upper end of the inner tube 36. Consequently, when the piston 80 is moved on an upward stroke from the bottom of the cylinder 81, it will raise the arm 77 which in turn will raise the inner tube 36 and also lift the latch pin 74 upwardly from the notch 73 in the pulley 52. Lifting of the inner tube 36 relative to intermediate tube 34 will cause the gripper arms 41 to swing inwardly from their open positions. When a parison 12 has been delivered to the paste mold station and the paste mold has been closed with its top beneath the ledge 15 on the rim of the parison, closing of the gripper arms 41 in the manner described will cause the gripper jaws or blades to close on the projecting upper end portion of the parison beneath the bead 14. A collar 84 on the projecting upper end of intermediate tube 34 rests on pulley 52 and limits downward movement of tube 34 in shaft 31. The flanged lower end 37 of gripper operating inner tube 36 will contact with flanged lower end 45 of tube 34 when the gripper jaws are closed. There may be a slight further upward movement of inner tube 36, carrying tube 34 with it against pressure of spring 48, until an upwardly facing stop shoulder 85 on the lower end portion of tube 34 strikes the lower end of tubular shaft 31. This limit is predetermined to be such that the closed grippers will exert a lifting action on the parison sufficient to lift the shoulder 15 on the parison rim off the top of the closed paste mold. The feather or spline 35 between the tubular member 34 and shaft 31 moves in a vertical spline-way 86 of sufficient length to permit the limited sliding movement of member 34 in the shaft 31 while preventing relative rotary movement between these parts.

The piston 80 has a depending rod 87 encircled by a spring 88 compressed between the lower head of cylinder 81 and a stop washer 89 on lower end of rod 87 so as to tend to maintain the piston 80 at the bottom of the cylinder 81. The clamp 78 is fastened on the rod 79 in a position that is adjusted in relation to the contact of shoulder 85 with the lower end of shaft 31 so that the upward stroke of the piston in the cylinder will terminate at the time the upward movement of the tubular member 34 in the hollow shaft 31 is stopped.

An air discharge nozzle 90 is screwed into the lower end of the inner tube 36 so as to depend centrally of the gripper members to a desirable level, which may be slightly above, the same as or below the horizontal plane at which the gripper jaws grip the parison in the paste mold. The nozzle 90 has an external flange 91 at its lower end on which rests an annular valve disc 92 which has an outer diameter at its lower surface at least as great as the diameter of the upper end of the parison which it is intended to cover. A ring 93 of heat resistant metal or other material suitable for contact with the hot glass of the parison may be inset in an annular groove 94 in the bottom of valve member 92 so as to rest on the upper end or rim of the parison held by the grippers. The valve disc may be constrained to remain in sealing position on the upper end of the parison by its weight alone, this weight being predetermined by selection of the thickness and material of which the valve disc is composed so that any air pressure within the parison beyond a predetermined, moderate pressure will cause lifting of the valve disc and escape of excess air. A moderate air pressure in the parison thus may be constantly maintained during puff blowing, irrespective of considerable variation of pressure in the air supply or in the parison.

The air is supplied to the nozzle through the inner tube 36 from an intake nipple 95 which depends into and fits slidably in a bushing 96 in the upper end portion of inner tube 36. The intake nipple 95 depends from an L-fitting 97 which in turn is carried by an air pipe 98 extending through a transverse opening 99 in the upper part of rod 79 and connected by a flexible tube 100 with the outlet of a pneumatically operable valve 101 on the bracket 68. The valve 101 may be a spool valve having a longitudinally movable valve member 102 normally retained by a spring 103 in position to block off communication between the flexible tube 100 and an air intake pipe 104. The latter communicates with a side of valve 101 opposite the flexible outlet tube 100. The valve member 102 is moved to open position by air from an operating air tube 105 leading to the end of valve 101 opposite the spring 103. Delivery of air to the valve through the tube 105 may be controlled by a suitable timer (not shown), which in the conversion of the glassware forming machine as hereinbefore described may be the standard timer of that machine.

Air to lift the piston 80 in cylinder 81 may be supplied thereto under control of the same or any other suitable timer through an air passage which includes a bore 106 of vertical rod 23, a passageway indicated at 107 through the wall of the clamp 29 for the arm 28 and a passageway 108 in the arm 28 opening into the lower part of the cylinder 81 beneath the piston 80.

The operative position of combination blow head and gripper mechanism 27 may be at any one of a number of different heights above the level of the fixed position clutch member 60. Adjustment vertically of such position within limits requires loosening the clamp 29 and moving it along the rod 23 to the desired position and then again fastening the clamp. A preliminary step is to withdraw a cotter pin 109 which fastens the pulley 54 to the projecting upper portion of the rod 55 from its inserted position through one of a series of holes 110 in that rod and, after the adjustment of height of mechanism 27 has been effected, insert the cotter pin in the appropriate other hole 110. The clutch member 57 thus will always be returned to engagement with fixed position clutch member 60 irrespective of the particular level to which the mechanism 27 is lowered to reach its operative position.

The vertical movements of the rod 23 are effected by operation of the piston (not shown) in the cylinder 24 as is usual in this type of mechanism. Air for operating the piston in the cylinder 24 may be supplied thereto under control of the aforesaid machine timer. The combination blow head and gripper mechanism 27 is swung laterally from a position directly over the blow mold station when it is raised. This may be effected by the co-action of a projecting cam roller or other follower 111 on a portion of the rod 23 depending below the cylinder 24 with a suitable curved cam slot 112 in a cam skirt 113 depending from the cylinder 24 as shown in Fig. 10 or with a reversely curved otherwise similar cam slot 114 in a cam skirt 115 depending from the same cylinder instead of the skirt 113. When the skirt 113 is used, upward movement of the rod 23 to raise the combination blow head and gripper mechanism from its active position as shown in Fig. 2 and as shown by full lines in Fig. 3 will be attended by a lateral swinging movement of the arm 28 to the right as viewed in Fig. 3 so that mechanism 27 will be located at the right hand position A as indicated by dot and dash lines when the rod 23 is at the upper end of its stroke. This is a position appropriate to permit use of a separate takeout mechanism such as commonly is employed to remove the finally blown articles from a blow mold at the final blow mold station. When the skirt 115 is used, the raised position of the combination blow head and gripper mechanism 27 will be at the left hand position B as also indicated by dot and dash lines in Fig. 3. This position may be over a conveyor indicated by dot and dash lines at 116 to which each article made in the paste mold at the final blow mold station may be transferred by the grippers of mechanism. Such mechanism thus functions as a take-out so that a separate take-out mechanism as commonly employed may be dispensed with.

A cycle of operations of the apparatus just described may be substantially as follows. A charge of molten glass is formed into the parison 12 by an upward pressing stroke of the inverted pressing plunger 10 of the parison forming mechanism shown in Fig. 1. It, of course, will be understood that the timing and sequence of operation of the parts involved in this and subsequently described steps of the cycle may be controlled by the usual forming machine timer although any other suitable known timing means may be employed. After the parison has been formed and the parison mold has been opened, the parison is given a swinging and reverting transfer movement by the neck ring and is presented upright, i. e. with its open end uppermost, at the blow mold station. The paste mold halves then are closed about the parison to embrace its upper end portion beneath the ledge 15, after which the neck ring is opened to release the parison and is returned to the parison forming station. The rod 23 carrying the combination blow head and gripper mechanism 27 is immediately lowered to its operative position and piston 80 in cylinder 81 is moved on its upward stroke to close the grippers on the parison rim as shown in Fig. 2 and to lift them and the parison as a unit slightly so that ledge 15 on the parison rim is clear of the top surface of the paste mold. The upward stroke of piston 80 will cause release of pulley 52 from its latch so that the grippers will be rotated to rotate the parison suspended therefrom. The paste mold halves are opened when the grippers take over suspension of the parison and the internal surfaces thereof are wet by water spray discharged from nozzles 117, Fig. 6. A bottom plate 118 which may be provided to complete the paste mold when the halves of the latter are closed also may be supplied with water at the same time. For this purpose, a water line 119 has branches 120 leading to the nozzles 117 and a branch 121 leading to the bottom plate 118. A normally closed valve 122 in supply line 119 is opened at an appropriate time for discharge of the water. This valve may be controlled by the usual machine timer but for convenience of illustration, it is shown as controlled by a rotating cam 123, Fig. 6. The halves of the paste mold may be provided with passages through the walls thereof as indicated at 124 to conduct away during blowing some of the water supplied to the internal surfaces of the mold halves. The bottom plate 118 may have supply passages 118a opening through the upper surface thereof and to which water passes from branch line 121.

A puff of air may be applied to the interior of the parison, now suspended from the grippers, on opening of the paste mold as just described. As shown in Fig. 5, the grippers have seized the parison and the paste mold is partly open. The shape of the suspended rotating parison, indicated by the dot and dash lines at 125 in Fig. 5, will be changed by puff-blowing, reheating, elongation and stretching. Soon it may attain a shape somewhat as indicated by the full lines at 126 in Fig. 5. While the halves of the paste mold remain open and are being wetted internally as in Fig. 6, the parison is further developed by puff blowing, stretching, etc., so that it may attain a shape substantially as indicated in full lines at 127. Subsequently, the paste mold is closed and the parison is blown to the internal shape thereof so that it has the shape of the final article as indicated at 13 in Fig. 7 and also in Figs. 8 and 9.

Thereafter, the halves of the paste mold may be opened while the article remains in the grasp of the rotating grippers as shown in Fig. 8. This may be followed by raising of the grippers and the article for take-out of the article by the grippers as previously described.

Alternatively, the grippers may be opened and raised, the paste mold opened and separate take-out tongs, indicated at 128, engaged with the upper end of the formed paste mold article as shown in Fig. 9 and as also previously described. In either event, the rotation of the grippers will be automatically stopped when they are raised.

In the practice of forming paste mold ware, the expanding parison is rotated against film on the internal surface of the mold and success of the operation and quality of the ware produced depend on predetermination of suitable puff blowing, time periods for stretching and reheating, etc. After an initial puff of air which may be relatively strong, puff blowing preferably should be at a moderate relatively constant pressure. In any event, it is desirable that there be no sudden, relatively great changes of pressure. The gravity positioned valve member 92 which rests on the upper end of the suspended parison has been found in practice to provide an improved result in paste mold ware production. It opens and closes rapidly and as frequently as required to maintain the pressure within the parison substantially constant and moderate.

I do not wish to be limited to the details of the illustrative apparatus shown and herein described since various changes therein and modifications thereof will readily occur to those skilled in the art.

I claim:
1. The method of forming a paste mold article of glassware which comprises presenting a hollow open ended parison in upright position at a paste mold station, closing a plural-part paste mold about the parison to support it with its open upper extremity projecting slightly above the paste mold and the remainder of the parison depending in the mold out of contact therewith except at the top of the mold, gripping the projecting upper extremity of the parison and effecting a slight relative vertical movement between the parison and the mold to take the weight of the parison off the mold while the major portion of the parison remains suspended in the mold, effecting relative rotation between the parison and the mold and blowing the parison to the internal shape of the mold.

2. The method as defined by claim 1 wherein the slight relative vertical movement between the parison and the mold is effected by positively lifting the parison by a force applied to its projecting upper extremity.

3. In glass forming apparatus, a paste mold comprising a plurality of cooperative sections, pivoted arms carrying the individual sections and operable to open and close them, liquid spray nozzles located in positions to discharge liquid onto the internal surfaces of the mold sections when said sections are open, a combination blow head and rotary gripper mechanism movable from a relatively raised and laterally disaligned position to a lower position directly above and in axial alignment with the closed mold sections, said combination mechanism comprising grippers operable to grip the upper end portion of an upright hollow parison projecting above the mold and to rotate the parison and further comprising means to deliver blowing fluid to the interior of the parison in the mold, a bottom plate operatively positioned at the bottom of the closed mold sections and having passages for liquid opening through its upper surface and liquid supply means operatively connected to said passages to direct therethrough to the internal surface of said bottom plate.

4. The method of forming a paste mold article of glassware which comprises closing the sections of a plural section openable and closable paste mold about an upright, open-ended glass parison at the paste mold station to support said parison in the mold with the extreme upper end portion of the parison projecting above the closed mold gripping the projecting upper end portion of the parison by grippers positioned above the mold to take over support of the parison from the mold when the mold is opened, opening the sections of the mold to permit the parison to stretch and reheat at the paste mold station while supported there by said grippers, wetting the internal surfaces of the open mold sections during this period of reheat and stretching of said parison, thereafter again closing the paste mold about the parison, and blowing the parison to final form in the paste mold while effecting relative rotary movement between the parison and the mold.

5. The method of forming a paste mold article of glassware which comprises closing a plural-section openable and closable paste mold at a relatively fixed station to enclose an upright parison positioned there and temporarily to support said parison so that the upper extremity of the parison projects above the closed paste mold, suspending the parison by its projecting upper extremity by means independent of the mold to take the weight of the parison off the mold, opening the mold while continuing to suspend the parison within the confines of the open mold, wetting the internal surfaces of the open mold sections while the thus suspended parison is permitted to reheat and stretch, applying blowing air to the interior of the suspended parison before final blowing thereof, and finally blowing the parison to the internal shape of the closed paste mold while effecting relative rotation between the parison and the closed paste mold.

6. The method defined by claim 5 wherein the relative rotation between the parison and the paste mold is effected by rotating the parison about its vertical axis while suspending it in the mold.

7. An attachment for an axially movable and angularly oscillatory vertical rod located adjacent to a blow mold station, said attachment comprising an arm attachable to said rod and a combination blowing and parison gripping and rotating mechanism carried by said attachment arm so as to be positioned by operations of said vertical rod periodically at an active position in relation to a parison in a paste mold at the blow mold station and periodically at an inactive, out of the way position relatively remote from that station, said combination mechanism comprising an individually rotatable vertical tubular shaft mounted in said arm, a gripper carrying vertical tube mounted in said tubular shaft to rotate therewith, pivoted cooperative grippers suspended from the lower end of said gripper carrying tube, a vertical blow tube mounted in said gripper carrying tube to rotate therewith and for limited vertical movements relative thereto, means operable by vertical movements of said blow tube relative to the gripper carrying tube to operate said pivoted grippers, and means to move the blow tube vertically relative to the gripper carrying tube.

8. An attachment as defined by claim 7 wherein said gripper carrying tube is mounted in said vertical tubular shaft for limited vertical movements relative thereto, the grippers are given closing movements by an upward movement of the blow tube relative to the gripper carrying tube, and the means to move the blow tube vertically relative to the gripper carrying tube is operable to effect a further upward movement of the blow tube and the gripper carrying tube in unison after the blow tube has been moved to the limit of its upward movement relative to the gripper carrying tube.

9. An attachment as defined by claim 7 wherein the means to move the blow tube vertically relative to the gripper carrying tube comprises an air motor carried by said arm and operatively connected with the blow tube to move it vertically relative to the arm.

10. An attachment as defined by claim 7 and in combination therewith, normally inactive driving means rendered effective to impart rotation to said rotary tubular shaft when said combination mechanism has been brought to its active position at said blow mold station and said grippers have been closed to grip the parison in the mold at that station.

11. An attachment as defined by claim 7 and, in combination therewith, a drive for said rotary tubular shaft comprising a constantly rotating clutch element located in a relatively fixed position below the level of said arm, a vertical clutch shaft carried by said arm, a clutch element carried by the lower end of said clutch shaft in position to engage with and be driven by said constantly rotating clutch element when said arm has been moved to position said combination blowing and parison gripping and rotating mechanism in its lowered active position at the blow mold station, and motion transmitting means operatively connecting said clutch shaft with said rotary tubular shaft.

12. An attachment as defined by claim 7 and, in combination therewith, a drive for said rotary tubular shaft comprising a constantly rotating clutch element located in a relatively fixed position below the level of said arm, a vertical clutch shaft carried by said arm, a clutch element carried by the lower end of said clutch shaft in position to engage with and be driven by said constantly rotating clutch element when said arm has been moved to position said combination blowing and parison gripping and rotating mechanism in its lowered active position at the blow mold station, a driving pulley on the clutch shaft, a driven pulley on the rotary tubular shaft, and a belt operatively trained about said pulleys.

13. An attachment as defined by claim 12 and in addition, a latch element connected to move vertically with the blow tube and engaged with said driven pulley to prevent rotation thereof irrespective of rotation of the driving pulley when the blow tube is at the limit of its gripper opening vertical movement relative to the gripper carrying tube, and pneumatic means carried by said arm and operable to move said latch element and the blow tube vertically in unison to effect closing of the grippers and release of the driven pulley for rotation by its connection with the driving pulley.

14. An attachment as defined by claim 7, and in addition, blowing air supply means operatively connected with the blow tube and comprising a normally closed pneumatic valve occupying a relatively fixed position above said vertical rod, a flexible tube leading from said valve to the blow tube, and a valve operating air connection for delivering air to the valve to open it.

GEORGE E. ROWE.

References Cited in the file of this patent

UNITED STATES PATENTS

| Number | Name | Date |
| --- | --- | --- |
| 608,022 | Bingham | July 26, 1898 |
| 687,595 | Blue | Nov. 26, 1901 |
| 858,379 | Frederick | July 2, 1907 |
| 1,689,975 | Sloan | Oct. 30, 1928 |
| 1,741,708 | Milliken | Dec. 31, 1929 |
| 1,854,471 | Hofmann | Apr. 19, 1932 |
| 1,865,967 | Schoonenberg | July 5, 1932 |
| 1,911,119 | Ingle | May 23, 1933 |
| 1,919,176 | Soubier et al. | July 18, 1933 |
| 2,167,919 | Wadsworth | Aug. 1, 1939 |
| 2,225,948 | Beatty | Dec. 24, 1940 |
| 2,278,572 | Slick | Apr. 7, 1942 |
| 2,348,347 | Koob | May 9, 1944 |
| 2,363,999 | Samuelson et al. | Nov. 28, 1944 |
| 2,382,052 | Gray | Aug. 14, 1945 |
| 2,495,253 | Hayes | Jan. 24, 1950 |

FOREIGN PATENTS

| Number | Country | Date |
| --- | --- | --- |
| 310,421 | Great Britain | Feb. 27, 1930 |